United States Patent [19]

Bonnet

[11] Patent Number: 4,840,521

[45] Date of Patent: Jun. 20, 1989

[54] ELEMENT FOR FILTERING STRESS VARIATIONS IN A BOLTED ASSEMBLY

[75] Inventor: Bernard Bonnet, Eaubonne, France

[73] Assignee: Framatome, Courbevoie, France

[21] Appl. No.: 110,628

[22] Filed: Oct. 16, 1987

Related U.S. Application Data

[63] Continuation of Ser. No. 830,794, Feb. 19, 1986, abandoned.

[30] Foreign Application Priority Data

Feb. 19, 1985 [FR] France .................................. 8502360

[51] Int. Cl.$^4$ .......................... F16B 31/12; G01L 1/04
[52] U.S. Cl. ....................................... 411/14; 411/12; 73/862.62
[58] Field of Search ..................................... 411/10–12, 411/14, 157–159, 544, 916, 917, 960; 116/200, DIG. 34; 73/761, 862.62

[56] References Cited

U.S. PATENT DOCUMENTS

| | | | |
|---|---|---|---|
| 302,441 | 7/1884 | Stevens | 411/158 |
| 2,830,486 | 4/1958 | Dillon | 116/DIG. 34 |
| 3,242,726 | 3/1966 | Willis | 73/862.62 |
| 4,000,681 | 1/1977 | Coldren | 411/12 |
| 4,047,463 | 9/1977 | Coldren | 411/12 |
| 4,090,399 | 5/1978 | Babcock | 116/DIG. 34 |

Primary Examiner—Neill R. Wilson
Attorney, Agent, or Firm—Pollock, Vande Sande & Priddy

[57] ABSTRACT

The element is constituted by an elongated tube whose height is equal to or exceeds 0.8 times its diameter, and which has a bearing surface on one face of the members to be assembled and a bearing surface on one face of a nut, the two bearing surfaces being interrupted by a slot completely passing through the tube in a generally longitudinal directional section, a displacement being provided on each of the bearing surfaces and between the zones of the bearing surfaces respectively located on either side of the slot, the two displacements being in opposite directions in the longitudinal direction of the element.

6 Claims, 3 Drawing Sheets

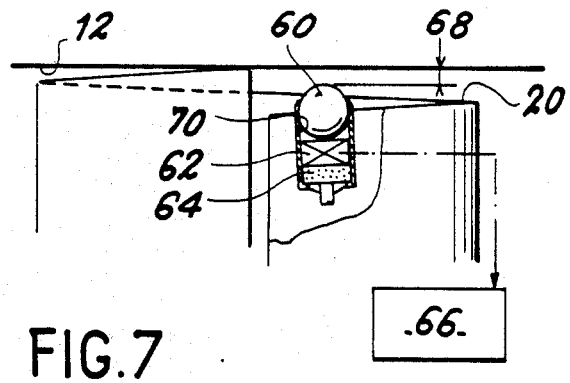
FIG.7
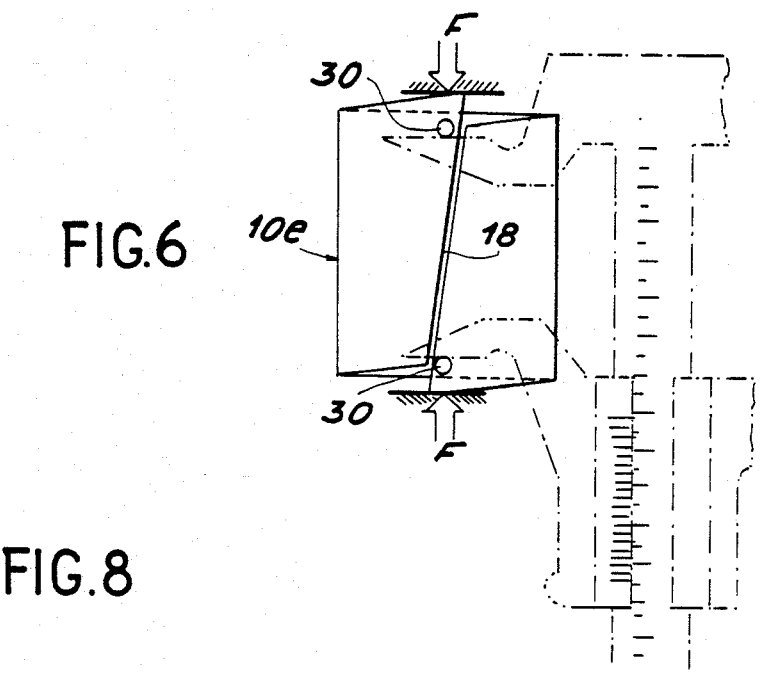
FIG.6
FIG.8
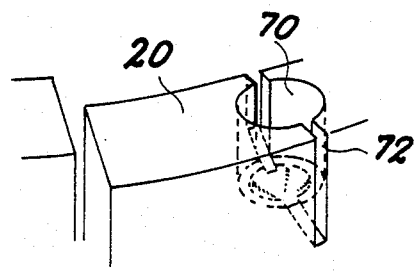

ELEMENT FOR FILTERING STRESS VARIATIONS IN A BOLTED ASSEMBLY

This application is a continuation, of application Ser. No. 830,794, filed Feb. 19, 1985, now abandoned.

BACKGROUND OF THE INVENTION

A bolted assembly comprises first and second parts having at least one facing hole, a screw passing through said holes and a nut screwed onto the screw. Such assemblies are initially tightened to a predetermined torque value. However, under normal operating conditions, the bolted assemblies can be subject to both thermal stresses and mechanical stresses, like vibrations, which can lead to modifications to the tension initially introduced into the bolts during the initial tightening operation. In turn, these variations can lead to a partial or even total loss of the function imparted to the bolted assembly.

This is, for example, the case in dismantleable heat exchangers with bolted assemblies, when they are subject to high thermal transients. Thus, these transients can give rise to overtightening during hot shocks. Such overtightening may lead to permanent deformation of the bolts or studs or to deformation of the assembled parts. This can lead to a sealing loss in the assembly, when the exchanger returns to normal temperature conditions. Thermal transients can also give rise to cold shocks, which produce undertightening effects which, although not leading to a deterioration in the structures, particularly the bolts, reduce the crushing or compression pressures of the joints and also cause leaks.

The prior art discloses various measures for reducing the extent of the stress variations on bolted assemblies in use.

In the case of existing equipment and when the initial tightening stresses and variations are small, it is known to place beneath the nuts or bolt heads helical washers called spring or lock washers. Such washers are mass produced from a ring of small height with a trapezoidal section, followed by slitting a deformation in order to form the equivalent of a spring with one turn. In the free state the height of such a washer is approximately twice the height of the ring, which corresponds to a helical pitch close to the thickness. When the washer is compressed, it has the flat shape of a conventional washer. All the initial deflection or sag is cancelled out by the tightening force.

The function of these helical washers is twofold, in that they act as a nut lock preventing rotation thereof and can also compensate by spring effect for a slight reduction in the tension in the bolts. However, it is pointed out that these washers only act in the case of a pressure reduction. In the opposite case of a pressure increase, they permit no compensation of the tension in the bolts because, as stated hereinbefore, all the initial deflection or sag is cancelled out, and consequently such spring washers are then shaped like a conventional washer.

The very way in which these components are manufactured implies that the forces which the washers have to transmit in their elastic operating range are lower than the force necessary for the initial deformation of the ring. Thus, bearing in mind the small dimensions of said ring, the forces which can be transmitted in operation are also small.

The prior art also discloses conical washers, called cupped washers. In their useful zone, these washers can transmit higher forces than in the case of spring washers, but they are still not very high. If the transmitted force is to be increased, it is necessary to superimpose several such washers. However, the behavior of this assembly becomes non-linear and variable as a function of the evolution direction of the charge or load. It is in particular highly dependent on the contact conditions between the washers. Moreover, there is a risk of deterioration of these washers if, as a result of incidents, the sag imposed exceeds approximately two-thirds of the washer height. Furthermore, in the case of a high tightening force, the stresses in operation in the washer exceed those permitted by the nuts, studs or bolts of pressure equipment, such as a steam generator or heat exchanger.

In the case of such highly stressed equipment or any other equipment where it is not possible to satisfy the above conditions, it is still possible to lengthen the bolts in order to increase the elastic deformation range of their shanks. This means that a spacer has to be introduced round the bolts to ensure the continuity of the assembly. However, to be effective, this measure requires a significant lengthening of the bolts, which is often incompatible with the assembly or overall dimension conditions.

SUMMARY OF THE INVENTION

The present invention relates to an element for filtering out stress variations occurring in a bolted assembly, and which obviates the above disadvantages. It must have limited overall dimensions and must be able to withstand a very high tightening force.

According to the invention, these objectives are achieved in that the filtering element is constituted by a generally elongated tube, whose length is equal to or greater than 0.8 times its diameter. The element surrounds the screw and has a bearing surface on one face of one of the first and second members. It also has a bearing surface on one face of the nut, said two bearing surfaces being interrupted by a slot, which completely transverses the tube in accordance with a longitudinal direction section thereof, an offset being provided on each of the bearing surfaces and between the zones of the bearing surfaces, respectively, on either side of said slot, said two offsets being oppositely directed as a function of the longitudinal direction of the element.

According to one variant, at least one of said bearing surfaces has a single tooth on the edge of the slot.

According to another variant, at least one of said bearing surfaces has a plurality of teeth distributed over the periphery of the bearing surface and having decreasing heights.

Preferably, the element according to the invention has means permitting the measurement of its compression or crushing. These means can be constituted by two pins, one on one of the sides of the slot and the other on the opposite side, the two pins being spaced by a predetermined amount. They can also be constituted by a pin located on one of the sides of the slot and a strip fixed to the other side thereof and positioned transversely thereto.

According to a third variant, the slot is formed by two portions displaced with respect to one another and connected by an e.g. cylindrical cutout, made along the tube circumference. A calibrated feeler gauge can be introduced into said cutout in order to check the sag or deflection of the element.

According to a special variant intended for the case where little space is available between two adjacent bolts or studs, the element has two flats formed on the tube symmetrically with respect to a plane passing through the axis of the element and through the longitudinal slot of the tube.

Moreover, the invention relates to a bolted assembly having a filtering element, wherein the offset between the zones located on either side of the slot is equal to h when the filtering element is in the free state and wherein this offset is approximately h/2 when the bolted assembly is tightened and in the absence of stresses other than the tightening tension.

BRIEF DESCRIPTION OF THE DRAWINGS

The invention is described in greater detail hereinafter relative to non-limitative embodiments and the attached drawings, wherein

FIG. 6 shows a view of the element according to the invention with a slightly inclined slot;

FIG. 7 is a view of a filtering element according to the invention provided with a detector of a predetermined compression or crushing value; and FIG. 8 is a perspective view of a detail of FIG. 7.

DETAILED DESCRIPTION OF THE PREFERRED EMBODIMENTS

Figure 1:
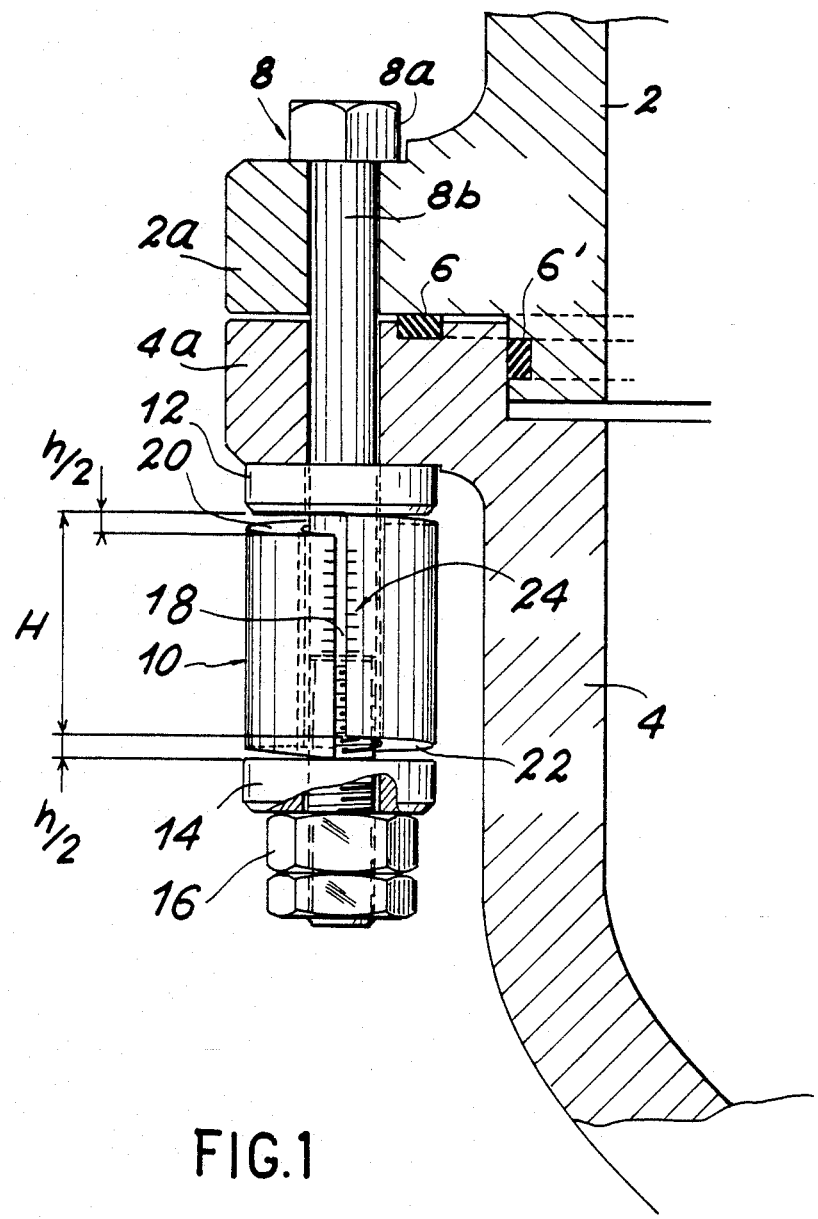
FIG. 1 shows a view of a bolted assembly having a stress filtering element according to the invention shown in the tightened state.

FIG. 1 shows a bolted assembly equipped with an element for filtering stress variations in accordance with the invention. The assembly is constituted by a first member 2 and second member 4. A seal is provided between these two members by means of a joint 6 compressed between flanges 2a and 4a of members 2 and 4, respectively. Another joint 6' is provided in a groove on a cylindrical part of member 2.

Members 2 and 4 are assembled by a series of bolts distributed over the periphery of flanges 2a and 4a. A single bolt 8 is shown in FIG. 1. Each bolt has a head 8a and a threaded shank 8b at the end opposite to the head. An element 10 according to the invention for filtering stress variations in the bolted assembly is placed around shank 8b. It is fixed between a washer 12 placed between a bearing face of the flange 4a and an end of element 10, as well as a second washer 14 placed on shank 8b between the other end of element 10 and a nut 16.

As can be seen in FIG. 1, element 10 constituted by a thick cylindrical tube, whose height is of the same order of magnitude as the diameter. This ratio h/d can vary, in the standard cases, between 0.8 and 1.5. The internal diameter of the tube is chosen so that there is a small clearance of a few millimeters between element 10 and shank 8b. The tube is slatted over its entire height along a generatrix. Slot 18 has a width of approximately 1 mm and defines two rectangular facing faces. The length of each of these faces is equal to h and its width is equal to the thickness of the tube. On either side of the member, there is an offset between the edges constituted by the intersection of the two parallel rectangular faces and the two end surfaces 20, 22 of element 10. When the element is in a free state (which is not the case in FIG. 1), this offset or displacement is equal to h. The latter is small, i.e., roughly 1 mm, and is in all cases very small compared with the height H of element 10. For example, ratio h/H is approximately 0.01. The edges remain substantially perpendicular to the axis of the cylinder.

It can be seen on element 10 in FIG. 1 that the end surfaces 20, 22 define the bearing surfaces and are in the form of a helical ramp. This also applies to the embodiments of FIGS. 2, 3 and 5.

Element 10 is dimensioned in height, thickness and sag in such a way that its elastic deformation, resulting from the initial tightening stress of the nut 16, only consumes part of the available sag h. In other words, the displacement between the zones of each bearing surface 20, 22 located on either side of slot 18 is equal to h when the filtering element 10 is in its free state, and said displacement is approximately h/2 when the bolted assembly is tightened, in the absence of stresses other than the tightening tension. Depending on whether overtightening or undertightening phenomena are expected in connection with the operation of the assembly, it is appropriate for said initial sag to be below h/2 or above h/2. During these operational phases, the element 10 significantly reduces the stress variations for the bolted assembly 8 due to the flexibility introduced by it.

The invention incorporates means for measuring the sag h. In the embodiment shown in FIG. 1, said means are constituted by a vernier divided into 10 equal parts. This vernier has nine graduations on one side of slot 18 and ten graduations on the other. Thus, it makes it possible to measure the sag with an accuracy of 1/10 mm.

Filtering element 10 is preferably manufactured by machining. The internal diameter of the element is obtained from the outset when starting with a thick tube, or is obtained by perforation on starting with a solid cylinder. The tube is slotted over its entire height by milling along a generatrix. Each of the faces of the tube obtained in this way is machined so that, after machining, there is a displacement between the edges on either side of the slot. The machined surfaces are such that one passes monotonically from the upper edge to the lower edge. In the embodiment of FIGS. 1, 2, 3 and 5, each of the bearing surfaces is machined in accordance with a helical ramp.

Figure 2:
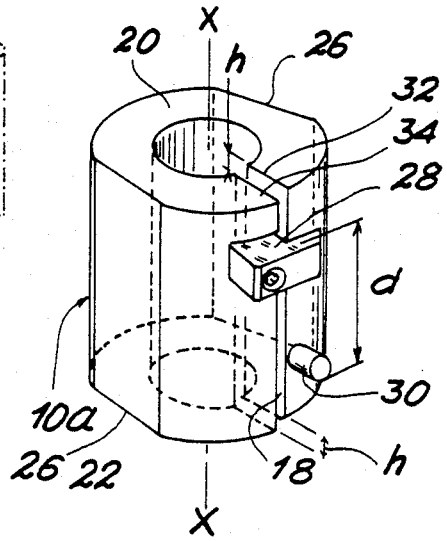
FIG. 2 is a perspective view of an element with cut faces adapted to the particular case where little space is available between the axes of two successive bolted assemblies.

FIG. 2. shows a variant in which the tube of element 10a has two cut faces 26 produced symmetrically with respect to a plane passing through the tube axis X—X and through the slot 18. The cut faces 26 serve to adapt the element to various overall dimensional conditions when on a flange, the distance between the studs being small. The variant of FIG. 2 is suitable for a circular flange. Therefore the cut faces 26 are radially oriented with respect to the axis of the flange for which the assembly is intended. According to a variant, the cut faces 26 can be parallel, if the elements are mounted on a rectilinear part.

Element 10a (FIG. 2) also has means making it possible to measure the sag or deformation. These means are constituted by a strip 28 positioned transversely with respect to slot 18 and fixed to one of the sides of said slot. These means comprise a pin 30 fixed to the other side of the slot at a predetermined distance d from the upper side of the strip. When element 10a is in its free state, i.e., when there is no stressing, the displacement between the two edges of a bearing surface 20 or 22, e.g., edges 32 and 34 of bearing surface 20 is h and the distance between the upper face of strip 28 and pin 30 is equal to d. When element 10a is tightened in a bolted assembly, the displacement between edges 32 and 43, as well as the displacement between the unreferenced edges of the opposite face 22, is reduced, e.g., to one-half its value, i.e. h/2. In order to obtain information on the amount of displacement in the tightened state, it is merely necessary to measure e.g., using a sliding caliper gauge, the new distance d' between the upper face of the transverse strip 28 and pin 30. The difference d-d' gives the variation in the sag of element 10a.

Figure 3:
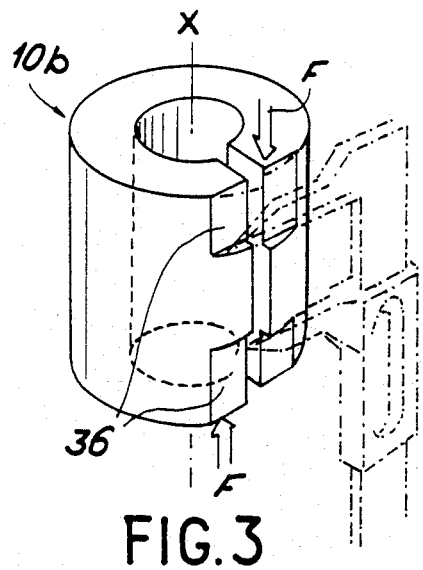
FIGS. 3 to 5 show a filtering element according to the invention with compression measuring means.

FIG. 3 shows a third variant of element 10b according to the invention. In this case, the tube is cylindrical and the bearing surfaces 20 and 22 are helical. Element 10b has flats or notches 36. In the free state of the element, the edges of the notches 36 are located at the same level, while when the element is compressed these edges are displaced in the opposite direction of the bearing zones by a distance which can be measured with the sliding caliper gauge. It is therefore possible to control the sag of the element in the tightened position.

Figure 4:
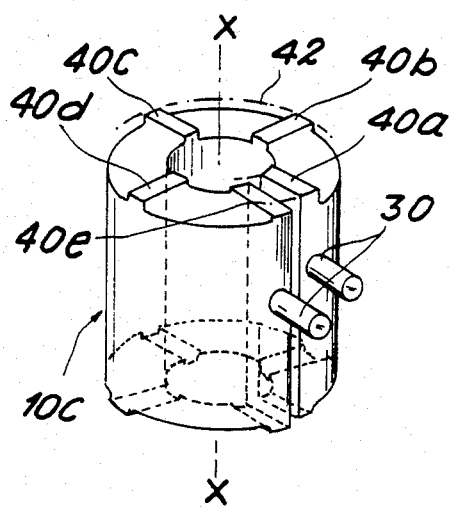

FIG. 4 shows another variant of an element 10c according to the invention. In this case, the upper bearing surface 20 and lower bearing surface 22 of the element are constituted by a series of teeth 40a, 40b, 40c, 40d, 40e of decreasing height. The teeth are angularly distributed in a regular manner and radially on the tube ends. The displacement between two successive teeth is such that it is possible to pass a helical surface designated by the broken lines 42 through the tip of said teeth. When element 10c is in its free state, the displacement between tooth 40a and tooth 40e is equal to h.

Element 10c in FIG. 4 has means making it possible to measure the sag in the tightened state. These means are constituted by two pins 30 located on either side of slot 18 and spaced by a predetermined distance when element 10c is in its free state. It is possible to measure the spacing by any appropriate means, such as a sliding caliper gauge.

Figure 5:
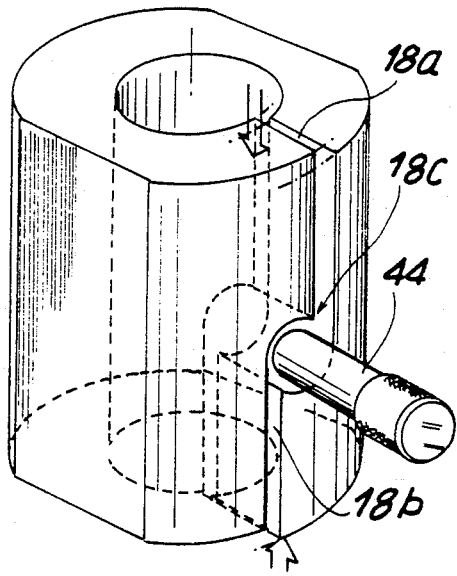

FIG. 5 shows a fifth variant of an element 10d according to the invention. In this case, slot 18 is constituted by two portions 18a, 18b, which are reciprocally angularly displaced with respect to the axis X—X of the element. Portions 18a, 18b are interconnected by a cutout 18c, which has a generally cylindrical shape in FIG. 5. A calibrated feeler gauge 44 can be introduced into cutout 18c to check the sag of the element.

FIG. 6 shows a variant in which slot 18 is slightly inclined, e.g., by 5°, so that pins 30 are located on the same generatrix, which permits an easy measurement of sag, e.g., using a sliding caliper gauge when a tightening force F is exerted.

FIG. 7 shows another variant of the invention in which element 10 has means for detecting a chosen sag value. These means are in this case constituted by a ball 60, a piezoelectric detector 62 and a compensator 64 beneath detector 62. The compensator may be formed from a foam rubber disc. Detector 62 is connected to an indicator 66. The diameter of ball 60 is determined in such a way that it comes into contact with washer 12 when a predetermined sag value is reached. The contact pressure of ball 60 on detector 62 actuates the indicator 66. Ball, detector and compensator are placed in a crimped cut, which is introduced to a predetermined depth in a hole 70 (see FIG. 8). A slot 72 permits the passage of the wires of detector 62.

The invention produces numerous advantages. Due to the solid configuration of the element, the latter operates in an elastic range under high loads, and can thus meet the stress criteria of bolts and the like in pressure equipment, such as steam generators and heat exchangers.

In view of the fact that the element is machined, it is possible to expect a high degree of accuracy and reproducibility in the functional dimensions and in particular the sag or compression h in the free state.

The element can easily be adapted, e.g., for calculations by the finished element method. It is therefore possible to obtain accurate information on its strength characteristics. Tests confirming the calculations have demonstrated that the variation in the deformation as a function of the force or stress is virtually linear over more than 80% of the available sag h. The element can easily be adapted as a function of the desired characteristics by acting on the height, thickness of the tube, sag from the outset and the material from which it is made.

The height dimensions are small. Moreover, the element can be adapted to widely differing overall dimensional conditions, as was explained with reference to FIG. 2.

In case of an accidental overload, the element is not destroyed. Moreover, when the sag is completely cancelled out, there is no permanent deformation of the element. It behaves like a standard rigid ring, and the maximum permitted loads are then considerable.

EXAMPLE

An element was produced, which was intended for an exchanger equipped with diameter 39 mm studs and which, on the water box side, was subject to very violent thermal transients from 20° to 300° C., with a return from 300° to 20° C. The element has the following dimensions:

Height H: 110 mm
External diameter: 106 mm
Internal diameter: 41 mm
Slot width: 3 mm
Sag: 1.2 mm.

There is a 1 mm compression of this element under a weight of 34 tons. The specified tightening force per stud for the apparatus is 17 tons. During the thermal transients, the maximum variations recorded are approximately +8 tons on overtightening and −4 tons on under tightening. Under the same conditions and using an apparatus not equipped with the element according to the invention, the variations would be two to three times greater.

Moreover, in order to obtain performance characteristics corresponding to those of the present element, it would be necessary to lengthen the studs by more than 500 mm. Thus, the overall dimensions of the element would be considerably increased, because the height of an element according to the invention is only 110 mm, i.e., about five times less.

What is claimed is:

1. A filtering element for filtering stress variations in a bolted assembly, the assembly having first and second members, each having at least one facing hole, a threaded member passing through said holes and a nut screwed onto a screw, wherein the filtering element constituted by a generally elongated tube whose height H is at least 0.8 times its diameter, which surrounds the screw and has a bearing surface on one face of one of the first and second members and bearing surface on one face of the nut, said two bearings surfaces being interrupted by a slot which completely transverses the tube in accordance with a generally longitudinal directional section thereof, a displacement h being provided on each of the bearing surfaces located respectively on either side of said slot, these two displacements being in opposite directions in accordance with the longitudinal direction of the element, the tube having two flats formed symmetrically with respect to a plane passing through the axis of the tube and through the longitudinal slot.

2. An element according to claim 1, wherein at least one of the bearing surfaces is constituted by a helical ramp.

3. An element according to claim 1, wherein it has means making it possible to measure the sag h.

4. An element according to claim 3, wherein said means are constituted by two pins, one of which is located on one of the sides of the slot and the other on the opposite side thereof, the two pins being spaced by a predetermined distance d.

5. An element according to claim 3, wherein the means making it possible to measure the sag h are constituted by a pin located on one of the sides of the slot and by a transverse strip fixed to the other side of slot and positioned perpendicularly thereto, one face of the transverse strip being located at a predetermined distance d from the pin.

6. An element according to claim 1, wherein the slot is inclined with respect to the longitudinal axis of the element.

* * * * *